United States Patent Office 3,191,110
Patented June 22, 1965

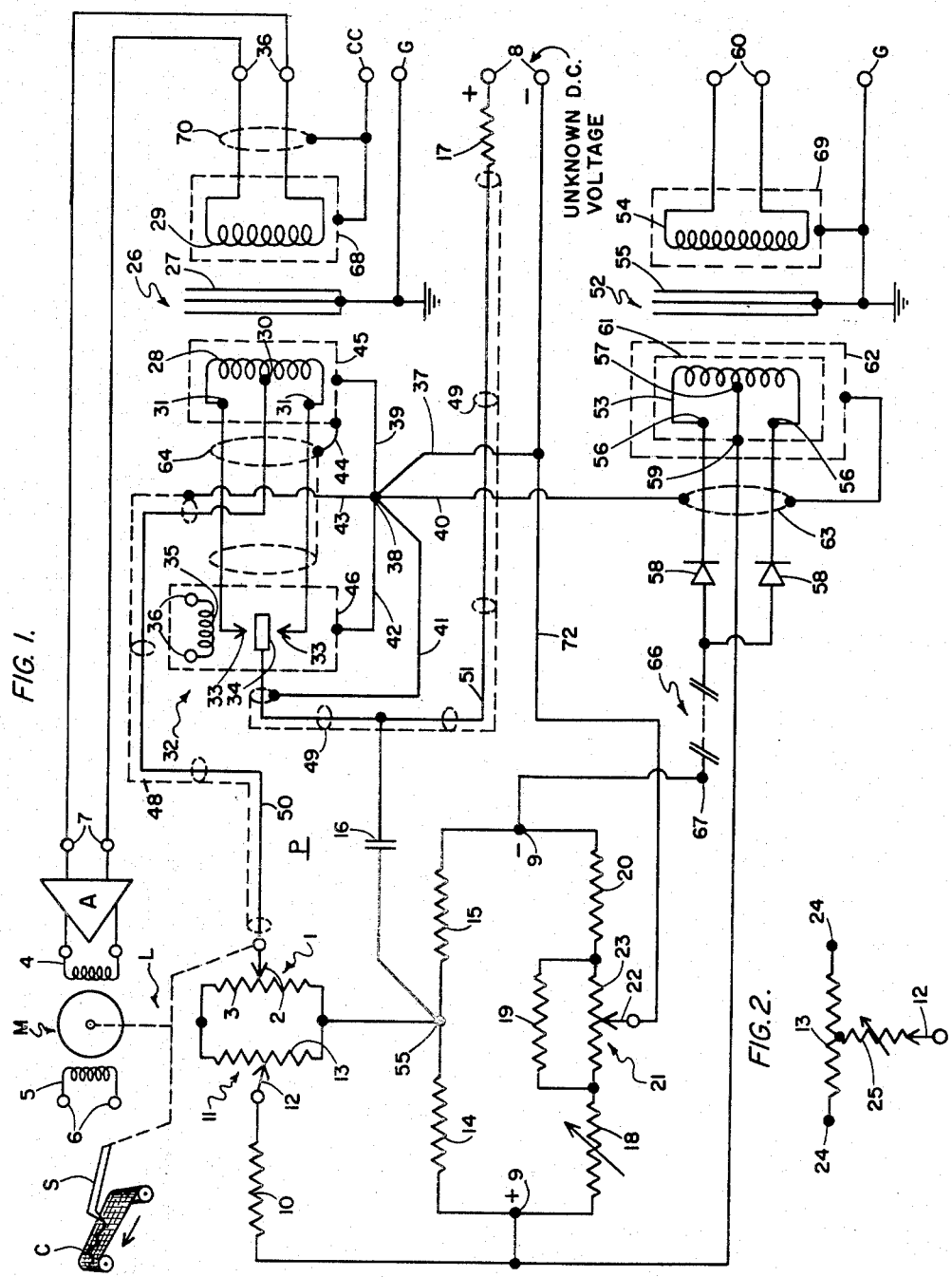

3,191,110
VOLTAGE-MEASURING POTENTIOMETRIC SYSTEM
William C. Evans, Rochester, N.Y., assignor to Taylor Instrument Companies, Rochester, N.Y., a corporation of New York
Filed Sept. 10, 1962, Ser. No. 222,318
11 Claims. (Cl. 318—28)

This invention relates to the measurement of voltage, in particular, D.C. voltages on the order of a few millivolts, such as may be provided by a thermocouple, or other low-voltage source.

The general object of the invention is to provide a voltage measuring system of the balancing, potentiometric type, which is relatively free of error due to pick-up of extraneous and unwanted electrical signals.

One specific object of the invention is to provide a novel potentiometric voltage-measuring system utilizing both high and low impedances that nevertheless exhibit overall a low-impedance character.

Another specific object of the invention is to provide a potentiometric voltage-measuring system provided with a novel electrical shielding arrangement.

These and other objects of the invention will become more particularly apparent in the description of the invention herein below.

FIGURE 1 is a schematic showing of a potentiometric voltage-measuring system according to the invention;

FIGURE 2 is a schematic diagram of a potentiometer or equivalent variable resistor or rheostat.

By way of introduction, the term "potentiometer" is used in the detailed description, and in the claims appended thereto, to signify an elongated resistance element whose overall resistance is the greater, the greater the length of the element, and which has a movable contact element, which may be moved to different places along the length of the resistance element, in contact with the resistance element such as to divide the resistance element into two resistances, one between one end of the resistance element and the contact element, and the other between the contact element and the other end of the resistance element. The said ends may be considered fixed terminals of the resistance element, or "slidewire," as it will be called hereinafter. The contact element may be considered a movable terminal of the resistance element, and will be called the "slider" hereinafter.

The slidewire may be straight or curved, and may consist of a single strand of resistance wire, or the like, which the slider contacts continuously along the length thereof. Again, the slidewire may instead be a wire, or the like, helically-wound on a straight or curbed form, the length of which form the slider follows contacting successive turns of the wire or the like. The second type of slidewire acts like a series of discrete resistance elements, more or less small, contacted successively by the slider so that the change in relative proportions between the two portions of the slidewire proceeds in step-fashion as the slider moves. I contemplate, however, that the step between adjacent ones of said series would be sufficiently small to assume a smooth variation in said proportions.

As is well known, if a potential difference exists across the slidewire, the potentiometer becomes a voltage divider, so to speak, since the voltage at the slider is intermediate in value with respect to the voltages at the ends, said voltage having a value determined by the proportions in which the slider divides the resistance of the slidewire.

In FIGURE 1, the potentiometric voltage-measuring system according to the invention is depicted as a recording-type instrument for measuring and recording a D.C. voltage which may be in the range of 0–10 millivolts. Thus, a moving strip chart C is moved past a stylus S, by means not shown. A motor M is provided, together with a mechanical linkage L, for moving the stylus S transverse to the direction of the motion of the strip chart, which is indicated by the arrow next adjacent the chart.

The linkage L also moves the slider 2 of a potentiometer 1 having a slidewire 3. In order to control the sense of the linkage movement and the sense of the movements of stylus S and slider 2, motor M is chosen to be of the rotating armature type, in combination with suitable reduction gearing, and having windings 4 and 5, said motor, when energized from suitable A.C. sources, rotates its armature in one of two opposite senses when both windings are energized, the particular sense depending on the phase relations of the A.C. signals, if any, in the windings 4 and 5. Winding 5, for this purpose, may be driven by 60 cycle current, ultimately derived from the mains, and applied to terminals 6 of winding 5. Winding 5 may therefore be assumed to be fixedly energized insofar as its input is concerned.

Winding 4, however, is energized by amplifier A which has applied to its input terminals 7, a 60 cycle voltage of variable voltage and phase. As is well known, the armature of motor M will not rotate, unless both windings are energized. Hence if the output of amplifier A is made representative of the polarity of some D.C. error voltage, armature M will rotate in a sense reflecting the corresponding characteristic of the D.C. error voltage. Moreover, if the motor motion is caused, by servo-techniques, to nullify the driving effect of the said D.C. error voltage, and it is arranged that the input to the amplifier A is zero or not, depending on whether the D.C. error voltage is zero or not, then the linkage L will be caused to change its position in an amount corresponding to the said D.C. error voltage.

In order to provide a suitable A.C. signal for amplifier A I have devised a novel potentiometric circuit indicated generally at P, in FIGURE 1, to apply to input terminals 7 of amplifier A, an A.C. voltage having a phase corresponding in polarity to the sign of the difference between an unknown D.C. voltage applied across terminals 8 and a given fraction of the reference voltage applied across the terminals 9, the polarities of application being indicated by plus and minus signs next the terminals in question.

The circuit P is made up of potentiometer 1, a resistor 10, a potentiometer 11, having a slider 12 and a slidewire 13, resistor 14, resistor 15, capacitor 16, resistor 17, variable resistance 18, resistor 19, resistor 20, and potentiometer 21 having a slider 22 and a slidewire 23.

It will be seen that the circuit P is of the genus shown in FIGURE 9A, at page 622 of Maddock, "Servo-Operated Recording Instruments"; Proceedings of the Institution of Electrical Engineers, vol. 103, Part B, No. 11; September 1956, pp. 617–632. Thus, points $a$ and $b$, Maddock, respectively correspond to the point at which slider 2 contacts slidewire 3, and to the point at which slider 22 contacts slidewire 23. Also, as in Maddock, the unknown voltage across terminals 8 is in series with the input of amplifier A and with the voltage across the points corresponding to Maddock's points $a$ and $b$.

As is evident from inspection of FIGURE 1, if the circuit P is properly proportioned as to the values of the resistance elements therein, with respect to the relation of the magnitude of the reference voltage across terminals 9 to the magnitude of the unknown voltage across terminals 8, then for a given range of the latter, a point on slidewire 2 could be found such that no current would flow out of or into the slidewire 3 via slider 2, supposing there to be a complete connection, via circuit P, between terminals 8. In fact, the position of slider 2 along slidewire 3 would represent the ratio between the unknown voltage and the reference voltage, and, the latter being fixed, the position of slider 2 can be taken to represent the magnitude of the unknown voltage, per se. Supposing the linkage L to transmit the motion of motor M in constant proportions to both stylus S and slider 2, the trace left by stylus S on chart C will also represent the value of the unknown voltage across terminals 8.

While the foregoing is, as a general proposition, a summary of prior art teachings, the circuit P represents an advance over the prior art in important respects.

In dealing with unknown voltages of a few millivolts, such as are available from thermocouples, for example, I find it expedient to operate at low impedance levels, in order to avoid problems of interference from stray electrical effects such as tend to inject or induce unwanted E.M.F's into the circuitry, in addition to the desired voltage across terminals 8.

Reduction of impedances, however, means low resistances and magnifies the affect of contact resistance. Insofar as fixed resistances, seldom-varied resistances, and the like, are concerned, contact resistance problems can be obviated by known construction techniques. For example, it is convenient to make variable resistance 18 of the type wherein its resistance is made up of permanently joined sections which can be shunted out in various combinations, in the style of a so-called decade-box type resistance. Resistance 18, however, is a standardizing resistance used for establishing a standard current flow therethrough and, once set, is seldom reset, and then only in fixed steps. Potentiometers 1, 11 and 21, however, are respectively the feedback, span and zero adjusting resistances and are subject to variation frequently and/or to almost any values in their ranges. It is a practical necessity, therefore, that the said potentiometers be lengths of resistive material along which slide their sliders effectively smoothly varying the relative proportions of the two portions of resistance into which the sliders divided the slidewires. However, the resistance-configuration of a potentiometer is in effect more complex than the potentiometer showings in FIGURE 1 indicate.

FIGURE 2 may be supposed to be a more realistic diagram of, say, potentiometer 11. Thus, while slidewire 12 as a whole may be taken to be a fixed and stable resistance between a pair of fixed terminals 24 to which corresponding terminals of slidewire 3 of potentiometer 1 would be connected, potentiometer 11 also has variable contact resistance 25 connected between slider 12 and the place on the surface of slidewire 13 contacted by the slider 12. Resistance 25, of course, is simply a film of oxides, grease, polymer, and/or the like material, which is mainly or entirely poorly conductive and erratic as to that.

It is intended to use potentiometer 1 for balancing the resistance network, hence, potentiometer 1 is required to be sufficiently durable to withstand millions of cyclings of its slider 2. A practical low-resistance potentiometer, however, uses a single strand, film or lamina of resistance material, along the length of which the slider slides, traversing each successive point along the length of the slidewire. Under this circumstance, the above-mentioned film, causing contact resistance between slider and resistance element, builds up to such extent as to insulate the slider from the slidewire.

A relatively-high resistance potentiometer, having its slidewire spirally wound on a mandrel, along which latter the slider slides from turn to turn of the slidewire, maintains reasonably low values of contact resistance between slider and slidewire for a substantially indefinitely-large number of slider-movements.

Therefore, potentiometer 1 is chosen to be one having a relatively-high resistance value, and potentiometer 11 is chosen to be of relatively-low resistance. This arrangement has several advantages. First, potentiometer 11 can be used as a span adjusting device for its setting determines the current flow through slidewire 3 of potentiometer 1. Again, it bypasses current from the slidewire 3, thus reducing circulation of stray currents through slidewire 3, and aiding in preserving the low impedance character of the resistance network.

Slider 12 will be moved far less frequently than slider 2, hence, potentiometer 11 can be of any construction allowing a substantially continuous variation over a given range of span adjustment.

Potentiometer 21 is also chosen to be of relatively-high resistance and is bypassed by resistor 19, which is chosen to have a relatively-low resistance. The reason for this is that it is generally desirable to use resistances that insofar as possible have little or no change in resistance due to temperature. This is difficult to achieve in a potentiometer, except by bypassing most of the current through it via a low-temperature coefficient resistor. Thus, resistor 19 should be made of manganin, or like material. Otherwise, potentiometer 21, which is used as a zero-adjusting element, and thus is relatively infrequently adjusted, may be of any construction permitting the desired range of zero adjustment.

As will be seen later, the contact resistances in potentiometers 21 and 1 will affect the sensitivity of the measurement made by the system shown in FIGURE 1, but will have no effect otherwise on the measurement.

However, the contact resistance in potentiometer 11 (i.e., resistance 25 in FIGURE 2) has an effect on the current flow through resistor 15 and slidewire 3, which may cause span error and zero errors in the measuring function of the instrument. Change in current through resistor 15 creates a zero error solely, and change in current through slidewire 3 has substantially only a span effect. I have found, however, that by shunting both resistor 10 and potentiometers 1 and 11, as shown in FIGURE 1, by resistor 14, the said errors can be minimized to a great extent by proper choice of the values of resistor 14 and resistor 10.

It can be shown that the current through resistance 15 and slidewire 3 should remain constant, if the position of slider 2 is to accurately represent the voltage across terminals 8. The effect of current change in resistor 15 can be minimized, to some extent, by making the resistance of resistor 15 small. However, the overall design of circuit P tends to relatively high-current operation. Therefore, a change of current through a resistor 15 of practical resistance value will still create a voltage drop that shifts the zero of the instrument. Obviously, any change of current due to contact resistance 25 between slider 12 and slidewire 13 will create a change in the current through resistor 15. According to the invention, most of the current that passes through resistor 15 is shunted around the said contact resistance and the resistance in series with the contact resistance, namely resistor 10, and the effective resistance of potentiometers 1 and 11 between resistor 10 and resistor 15.

Supposing the level of current and resistance 15 to have been chosen, one may compute the effect of a typical contact resistance error, in potentiometer 11, on the current through resistor 15, in terms of recording error. One then determines what fraction of such error can be tolerated, and accordingly chooses a resistor 14 and a parallel resistance such that the value of resistor 14 divided by the sum of resistance 14 and the said parallel resistance is substantially equal to that fraction. The parallel resistance includes resistance 10 in combination with the resistance represented by potentiometers 1 and 11.

In any event, it is essential that resistors 14 and 15 and slidewires 3 and 13 be connected together at their ends next terminal 55, such that no contact resistance problem arises. While in theory this does not mean that resistor 14 cannot be tapped to some intermediate portion of resistor 15, nevertheless, as a practical matter, it amounts to requiring that the pigtails of resistors 14 and 15, whatever hook-up wire may intervene, and the involved terminals of the potentiometers 11 and 1, be interconnected by solder joints or like stable expedient.

As it is necessary that circuit P provide an A.C. error signal for amplifier A, modulation of the D.C. error signal produced by circuit P is required. According to FIGURE 1, such modulation is provided by means of a periodic reversal of current through a transformer winding.

Specifically, a transformer 26 is provided having a core 27, a primary winding 28 and secondary winding 29, this last having terminals 36 for connection to the input terminals 7 of amplifier A. Transformer 26 also has a core 27 inductively coupling the two windings together so that a change of current through the one induces a voltage across the other.

Primary winding 28 has a center tap at 30, to which slider 2 is directly connected. Winding 28 also has terminals 31 at its ends, which terminals are directly connected to fixed contacts 33 of a chopper type modulator 32 having a third contact 34 and a motor, represented by a winding 35. Such motor, when its winding 35 is energized by an A.C. voltage across its terminals 36, causes contact 34 to cycle at the frequency of the said A.C., between fixed contacts 33, alternately dwelling upon each contact 33. Since, as FIGURE 1 shows, contact 34 is directly connected, via resistor 17, to the plus one of the terminals 8, it is evident that A.C. energization of winding 35 alternately energizes the winding-halves of winding 28. As the entire winding 28 is wound in the same sense, the voltage induced in winding 29 will alternate at the frequency of energization of the winding 35.

Since it is customary to energize windings 5 and 36 from 60 cycle sources, amplifier A and the transformer 26 will be designed for efficient operation at that frequency. Also, the phasing of the various connections from terminals 31 out to the motor M will be such that if any current flows through the modulator, then the direction of rotation of motor M, in response to such current flow, will be such as to move slider 2 in a direction such that the voltage at the slider increasingly opposes such flow.

As has been remarked before, it is desired to avoid pickup of extraneous E.M.F.'s in the circuit P. Circuit P is relatively free from this, due to its low resistance. Since it does have some resistance, obviously there is some pick-up. Moreover, the modulator 32 and transformer primary winding 28 represent a relatively high impedance. FIGURE 1 illustrates an arrangement of shielding and control of coupling to the environment of the instrument that are highly effective in preventing pick-up of extraneous E.M.F.'s.

To begin with, the entire input to the transformer 26 is floated off ground. In this circumstnace, I have found that the maximum benefit of shielding is produced by tying the input shield to an equipotential plane that is at the potential, with respect to ground, earth or otherwise, of one side of the source of voltage to be measured, e.g., where said source connects to the instrument, namely, terminals 3.

The main input conductors between impedances of circuit P are conductor 72 running from the minus one of terminals 8 to slider 22, conductor 50 running from slider 2 to centertap 30, conductor 51 running from resistor 17 to contact 34, and the conductors between terminals 31 and contacts 33. Of these, conductor 50 has a shield 48 of metallic foil, braid, or the like, surrounding it along as much of its length as is physically possible, and which is tied by a conductor 43 to a tie point 38, which in turn is tied by conductor 37 to conductor 72. Conductor 72 is the negative terminal of the voltage source, at least to the extent that the minus one of terminal 8 represents said negative terminal. If the actual voltage source is connected to terminals 8 by leads having substantial impedance, the conductor 37 may be extended to the negative terminal of the actual voltage source.

Conductor 51 is also shielded, but is separately tied to tie point 38 by a conductor 41. Conductor 72 is unshielded, though wherever it is close enough to conductors 50 and/or 51, it may be twisted together therewith and run inside the shielding, for twisting helps eliminate extraneous E.M.F.'s, also.

Winding 28 has a shield 45 enveloping it which in practice is continuous with shielding on the leads brought out from its terminals 31. Hence, the conductors between contacts 33 and terminals 31 are depicted as provided with a shield 64 tied directly, at 44, to shield 45. Shield 45 is tied by conductor 39 to tie point 38. Shield 45, and other winding shields disclosed infra, may be the usual foil wrappings with which transformer windings are customarily enveloped, for shielding purposes.

The described shielding is only capacitatively coupled to the conductors it shields. By dividing it into sections separately tied to tie point 38, currents introduced at a given point of a shielding section is restricted to that section, which is supposed to have no D.C. connection to any of the other sections provided with separate conductors or ties to tie point 38, except via tie point 38.

It is evident that the shielding described above acts somewhat in the usual way to prevent changing electrostatic fields in the vicinity of the system from coupling to the shielded elements, except via the capacitance between said entities and said shielding.

In addition, the said shielding provides a sort of A.C. ground to the chassis or other region of potential above which the input of the measuring system is supposed to float. That is, there will be a relatively-large distributed capacitance between the measuring system and the chassis or other portion of the electrical environment providing the said region of potential. Hence, electrical interference, say, due to a changing electrostatic field in the vicinity of the system, will induce A.C. in the system which is bled to ground through the distributed capacitance, instead of inducing E.M.F.'s in the higher-impedance system-components, e.g., modulator 32. Moreover, such currents as may arise in the low-impedance parts of the system, flow therein creating only small voltage drops and are bypassed around the high impedances by capacitor 16.

In the case of currents directly introduced into the system by a connection of, say, the negative terminal of the source of voltage being measured to one side of the A.C. mains, these currents are also returned to chassis or ground via the distributed capacitance, without traversing high-impedance system components.

If the tie point 38 were directly coupled to the chassis, or to ground, rather than to the negative terminal of the source of voltage to be measured, the distributed capacity of the shielding, with respect to the entities shielded, would be the immediate coupling between chassis or ground. If chassis or ground is at or near the potential of the other side of the A.C. mains, an A.C. drop of 100 volts or more may be created across the last said distributed capacity, whereby quite large currents could be caused to flow in the shielded portion of the system.

A similar situation would prevail if tie point 38 were located at some point in the system separated by impedance from the negative terminal of the voltage source being measured, for a large voltage drop would occur across said impedance.

Looking at the system as a whole, it will be observed that the series resistance of the resistance network between sliders 2 and 22 is relatively small (see list of parts values, infra). That is, the potential of slider 2 is close to that of tie point 38. Therefore, the voltage drop across the distributed capacitance of the network is overall small, and, in general, currents due to common mode signals are minimal.

If, as illustrated in FIGURE 1, the reference voltage across the terminals is ultimately derived from an A.C. source, such as power transformer 52 having secondary and primary windings 53 and 54, it is necessary to involve portions of the reference voltage supply system in the shielding of the measuring system.

In this instance, secondary winding 53, center-tapped at 57 between its end terminals 56, in order to provide for full-wave rectification by means of rectifiers 58, is provided with shields 61 and 62. Shield 62 includes a portion 63 extending around the leads from terminals 56 to the rectifiers 58. Portion 63 also extends around the lead from centertap 57, which connects directly to the plus one of terminals 9.

As a whole, shielding 62, 63 corresponds to shielding 45, 64. Accordingly, shielding 62, 63 is tied to tiepoint 38, via a conductor 40.

In addition, however, shield 61 is enveloped by shield 62, in turn envelops winding 53, and is connected to the centertap 57 at 59. The winding 53 varies in potential along its length, and would induce currents in the resistance network, via distributed capacitance to shield 62, but for shield 61.

Although secondary winding 29 of transformer 26, primary winding 54 of transformer 52, respective shields 68 and 69 of these windings, output terminals 36 to amplifier A, amplifier circuit common terminal CC and input terminals 60 for connection to the 60 cycle main power, and ground terminals G, are apparently isolated (except for the depicted inductive couplings to the remainder of the system, distributed capacitance in the transformer structure does couple closely associated electrical components of transformer structure. Moreover, the winding 35 of modulator 32 would normally be supplied from a separate low voltage second winding (not shown) on transformer 52, and, as the ground terminals G and their connections to cores 27 and 55 suggest, ground connections (chassis, earth, or even one side of the power source for terminals 60) will be designedly provided somewhere in the measuring system, more or less remote from that circuitry of the system which has been the main subject of discussion thus far.

Since transformers of reasonable size and cost of construction are notorious for possessing considerable distributed capacitance, strong A.C. coupling to ground via the transformer capacitance would exist in the absence of suitable shielding. As shown, the basic precaution taken is to insert shield 62 and tie it to tie point 38.

In the foregoing description the terms "relatively-high," "relatively-low," and the like, have been freely used. However, by way of illustration, the following table of parts values and description will allow a more determinate quantitative interpretation of said terms:

| | | |
|---|---|---|
| Slidewire 3 | ohms | 1000 |
| Slidewire 13 | do | 17 |
| Slidewire 23 | do | 300 |
| Resistor 10 | do | 755 |
| Resistor 14 | do | 103.5 |
| Resistor 15 | do | 1.8 |
| Resistor 17 | do | 1000 |
| Resistor 18 | do ca | 400 |
| Resistor 19 | ohms | 13 |
| Resistor 20 | do | 1.8 |
| Capacitor 16 | $\mu$f. 6 v | 33 |

The resistors are all ±1% except that resistor 14 should be ±0.1% and that resistor 18 is to be a resistor or combination of resistors of such value that 10 ma. D.C. flows therethrough to the plus one of terminals 9.

Potentiometer 21 sets the zero of the system, i.e., shifts the voltage scale with respect to a given range of excursions of stylus S with respect to chart C. Potentiometer 11 sets the span, that is, its setting determines the magnitude of the voltage difference covered by a given excursion of the stylus.

A typical power supply may provide about 4 volts output, in which case a resistance of about 400 ohms will be found suitable for the resistance shown as resistor 18.

Insofar as the modulator 32 is concerned, its impedance is mainly given by the loaded transformer 26. In a typical case, using a commercially available modulator and a like transformer 21, the impedance of modulator and transformer secondary as a whole may be equivalent to about 15,000 ohms.

The vibrator or mechanical chopper type modulator 32 and transformer combination, shown herein as converting the D.C. error signal to A.C., and coupling the latter to amplifier A, may be replaced by similar elements having like functions but being quite differently constructed. For example, it is well known that so-called solid state choppers, having no movable parts, but instead relying on the switching characteristics of one or more transistors, could be utilized in place of the mechanical modulator 32.

Returning to the matter of the impedance of modulator 32 and winding 28, it is this impedance that makes relatively harmless the contact resistance in potentiometers 1 and 21. That is, the corresponding contact resistances between sliders and slidewires, are in series with the last said impedance, with resistor 17, with the impedance of the voltage source across and terminals 8, and with the resistance of network P. Variation in any of these resistances and impedances will affect the sensitivity with which the system responds to a given change in the voltage across terminals 8. Typically, the said contact resistances form a relatively-small part of the total series impedance involved, hence, the contact resistances may vary relatively widely without seriously affecting the fidelity with which stylus S follows changes in the voltage across terminals 8.

The reference voltage across terminals 9 is disclosed to be derived from an A.C. source connected to rectifiers 58 by means of full-wave rectification, the pulsating D.C. output of which is combined and applied to suitable regulating and filtering means indicated very generally at 66, which may be imagined to have a minus output terminal 67, between which and center tap 57, appears a stable reference voltage applied to the terminals 9. However, a battery supply could be substituted for the illustrated supply, without other modifications, insofar as the function of resistor 14 and the shielding arrangement in the signal circuitry are concerned.

Although I have described the best form of my invention, and the manner of using and making it, in considerable detail, it is to be understood that various substitutions, modifications and uses thereof will be obvious to one skilled in the art, which may be exploited without departing from the scope of the invention as claimed hereinbelow.

I claim:

1. In a potentiometric circuit, a potentiometer and a voltage divider, the slidewire of said potentiometer being shunted across said voltage divider;
   a first resistance connecting the slider of said potentiometer to one terminal of a first source of voltage;
   a second resistance connected to the other terminal of said first source and in series with said voltage divider and said slidewire;
   a third resistance interconnecting the said one terminal of said first source and said second resistance;
   whereby the total resistance of a portion of the current path between said terminals, via said first resistance, is shunted by said third resistance;
   the resistance of said third resistance being substantially lesser than the said total resistance of the said portion of the said current path;
   and means for applying the voltage of a second source of voltage to said voltage divider.

2. In a potentiometric circuit, a relatively-low resistance potentiometer, a first resistance, and a first source of voltage;
   the slidewire of said potentiometer being connected via said first resistance to one terminal of said first source;

a second resistance, said second resistance interconnecting the slider of said potentiometer and the other terminal of said first source;

a third resistance, said third resistance connected between said terminals in shunt with said second resistor and said slidewire in series, and in series with said first resistance, said third resistance being substantially smaller than said second resistance;

and a second source of voltage, one terminal of said second source being connected by resistance to one of the terminals of said first source and by further resistance to the other of the terminals of the said first source, the other terminal of said second source being connected to said slidewire.

3. The invention of claim 2 including a second potentiometer having its slidewire connected to said first potentiometer to provide a voltage at its slider representative of the ratio between the voltages of said sources, the said other terminal of said second source being connected to the last said slider.

4. The invention of claim 2 including a second potentiometer having its slidewire connected across the slidewire of the first said potentiometer and having its slider connected to said other terminal of said second source.

5. In a potentiometric circuit, a relatively-low resistance potentiometer and a relatively-high resistance potentiometer, said potentiometers having their slidewires connected in parallel;

a first resistance and a first source of voltage, said first resistance connecting said slidewires in series with one terminal of said first source;

a second resistance, said second resistance connecting the slider of the first said potentiometer to the other terminal of said first source;

a third resistance, said third resistance interconnecting the said other terminal with the said one terminal of said first source via said first resistance and being in shunt with the series resistance of said second resistance and said paralleled slidewires;

and a second source of voltage having one terminal thereof connected by resistance to one terminal of said first source and by further resistance to the other terminal of said first source, the other terminal of said second source being connected to the slider of the second said potentiometer, said third resistance being substantially smaller than the resistance it shunts.

6. The invention of claim 5 in combination with servo means responsive to departure, from a given value, of the ratio between the voltages of said sources, to move the slider of said second said potentiometer in a direction and amount, along the associated slidewire, sufficing to reduce to zero the current in the connection of said other terminal of said second source to the last said slider.

7. In a potentiometric circuit having a first terminal and a second terminal, there being first resistance interconnecting said terminals:

a third terminal and second resistance interconnecting said second terminal and said third terminal;

a fourth terminal and third resistance interconnecting said third terminal and said fourth terminal;

and fourth resistance interconnecting said fourth terminal and said first terminal;

means for connecting one side of a first voltage source to said first terminal, means for connecting the other side of said first voltage source to said third terminal, means for connecting one side of a second voltage source to said second terminal, means for connecting the other side of said second voltage source to said fourth terminal;

a current flow detector having an impedance connected in series between one of said terminals and the side of the voltage source connected to the said one of said terminals, for detecting current flow via said impedance;

servo means responsive to said current flow to vary certain of said resistance in a sense such as to decrease said current flow;

and conductive electrical shielding means defining an equipotential surface substantially completely enclosing said impedance;

the improvement comprising electrically connecting said shielding means in effect to the terminal to which the other side of the last said voltage source is connected, such that the potential of said equi-potential surface is the potential of the last said terminal, said other of said terminals effectively being a terminal of the source of said last said voltage.

8. The invention of claim 7, wherein said shielding means also extends said equipotential surface around the current flow path directly between said impedance and said resistance, and around the current flow path directly between said impedance and the said last said source of voltage.

9. The invention of claim 7, wherein said current flow detector also includes switching means for periodically varying said current flow;

and each of said switching means and said impedance being enveloped in its own individual shielding;

each such shielding having a direct connection to said other of said terminals and being otherwise D.C.-isolated, each from the other.

10. The invention of claim 7, wherein the other of said voltages is produced across a transformer winding;

said transformer winding having a pair of enveloping shields each D.C.-isolated from each other and from said transformer winding, and one of said pair of shields enveloping the other thereof;

said one of said pair of shields being connected to the said other of said terminals, and the said other thereof being connected to a point on said winding and one of the remaining two said terminals;

the last of said terminals being connected to said winding at a point differing in potential from the first said point and each said pair of shields otherwise having D.C.-isolation from its environment.

11. The invention of claim 7, wherein said certain of said resistance includes a potentiometer having a slidewire of relatively high resistance value and a slider movable by said servo means, as aforesaid;

said slidewire being shunted by a resistor of such resistance value as to carry more current around said slidewire than is conducted through said slidewire.

References Cited by the Examiner
UNITED STATES PATENTS

| | | | |
|---|---|---|---|
| 2,628,332 | 2/53 | Richardson | 318—29 |
| 2,675,510 | 4/54 | Belcher | 318—28 |

JOHN F. COUCH, *Primary Examiner.*